United States Patent [19]

Anderson et al.

[11] Patent Number: 4,842,108
[45] Date of Patent: Jun. 27, 1989

[54] POWER RETRACT ELECTRIC CORD REEL

[75] Inventors: Marvin L. Anderson, Williston, N. Dak.; Gerald O. Irvine, Crosby, Minn.

[73] Assignee: Circle A Product, Inc., Sioux City, Iowa

[21] Appl. No.: 266,335

[22] Filed: Nov. 1, 1988

Related U.S. Application Data

[63] Continuation of Ser. No. 28,034, Mar. 18, 1987, abandoned, which is a continuation of Ser. No. 738,677, May 28, 1985, abandoned.

[51] Int. Cl.$^4$ .......................................... H02G 11/02
[52] U.S. Cl. ............................. 191/12.2 A; 191/12.4; 200/61.14; 242/54 R
[58] Field of Search ...................... 191/12.2 R, 12.2 A, 191/12.4; 242/54 R, 84.1 A, 85, 86.5 A; 200/61.15, 61.58 R, 61.81, 61.82, 61.14

[56] References Cited

U.S. PATENT DOCUMENTS

| | | | |
|---|---|---|---|
| 1,537,702 | 5/1925 | Rottgardt | 242/85 |
| 2,443,763 | 6/1948 | Dahlgren et al. | 191/12.2 A X |
| 2,530,773 | 11/1950 | Johnson et al. | 191/12.4 |
| 2,625,344 | 1/1953 | Flansburgh | 242/128 |
| 2,825,924 | 3/1958 | Humphrey | 191/12.2 R X |
| 3,011,033 | 11/1961 | Belicka et al. | 191/12.2 R |
| 3,400,423 | 9/1968 | Black, Jr. | 15/312 |
| 3,432,623 | 3/1969 | Blanch et al. | 191/12.2 R |
| 3,450,369 | 6/1969 | Blanch et al. | 191/12.2 R X |
| 3,619,518 | 9/1969 | Blanch et al. | 191/12.2 R |
| 3,694,588 | 9/1972 | Appleton | 191/12.2 R |
| 3,743,796 | 7/1973 | Rosencrantz | 191/12.2 A |
| 3,770,914 | 11/1973 | Larsen | 191/12.2 A |
| 3,853,209 | 12/1974 | Bond | 191/12.2 R |
| 3,929,210 | 12/1975 | Cutler et al. | 191/12.2 R |
| 4,300,665 | 11/1981 | Arechaga | 191/12.4 |
| 4,350,850 | 9/1982 | Kovacik et al. | 191/12.2 R |
| 4,436,190 | 3/1984 | Wentzell | 191/12.2 R |
| 4,447,043 | 5/1984 | Bocciard | 200/61.14 X |

Primary Examiner—Dennis H. Pedder
Attorney, Agent, or Firm—Kinney & Lange

[57] ABSTRACT

An electric cord reel is designed for mounting adjacent the engine of an automobile that requires a plug-in, heater, in particular, and has a power driven retract mechanism operable by an electric switch from the automotive battery or other power source, and which upon completion of retraction will shut off the retracting motor. The cord can be manually pulled out to be plugged into a receptacle at a desired location.

8 Claims, 2 Drawing Sheets

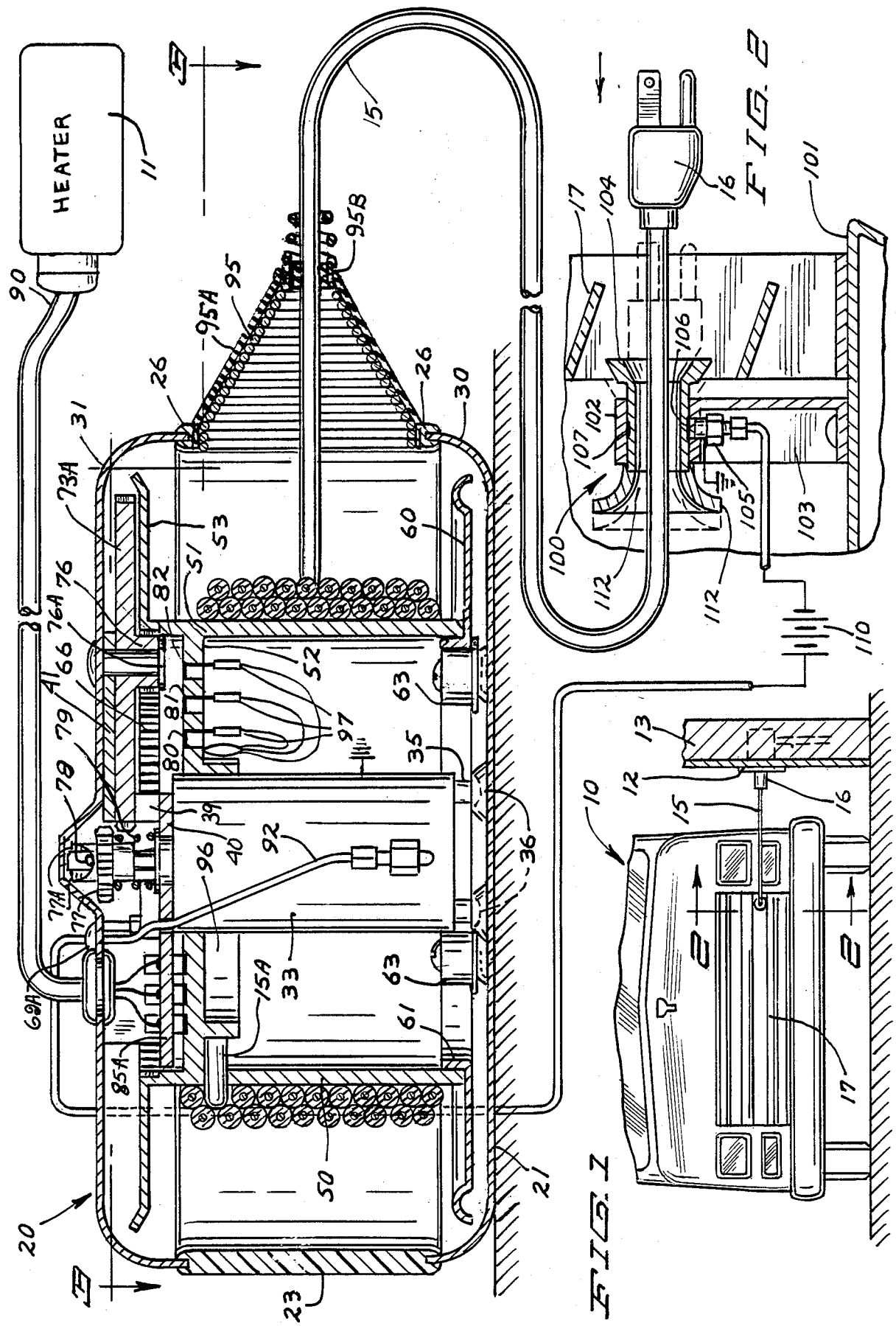

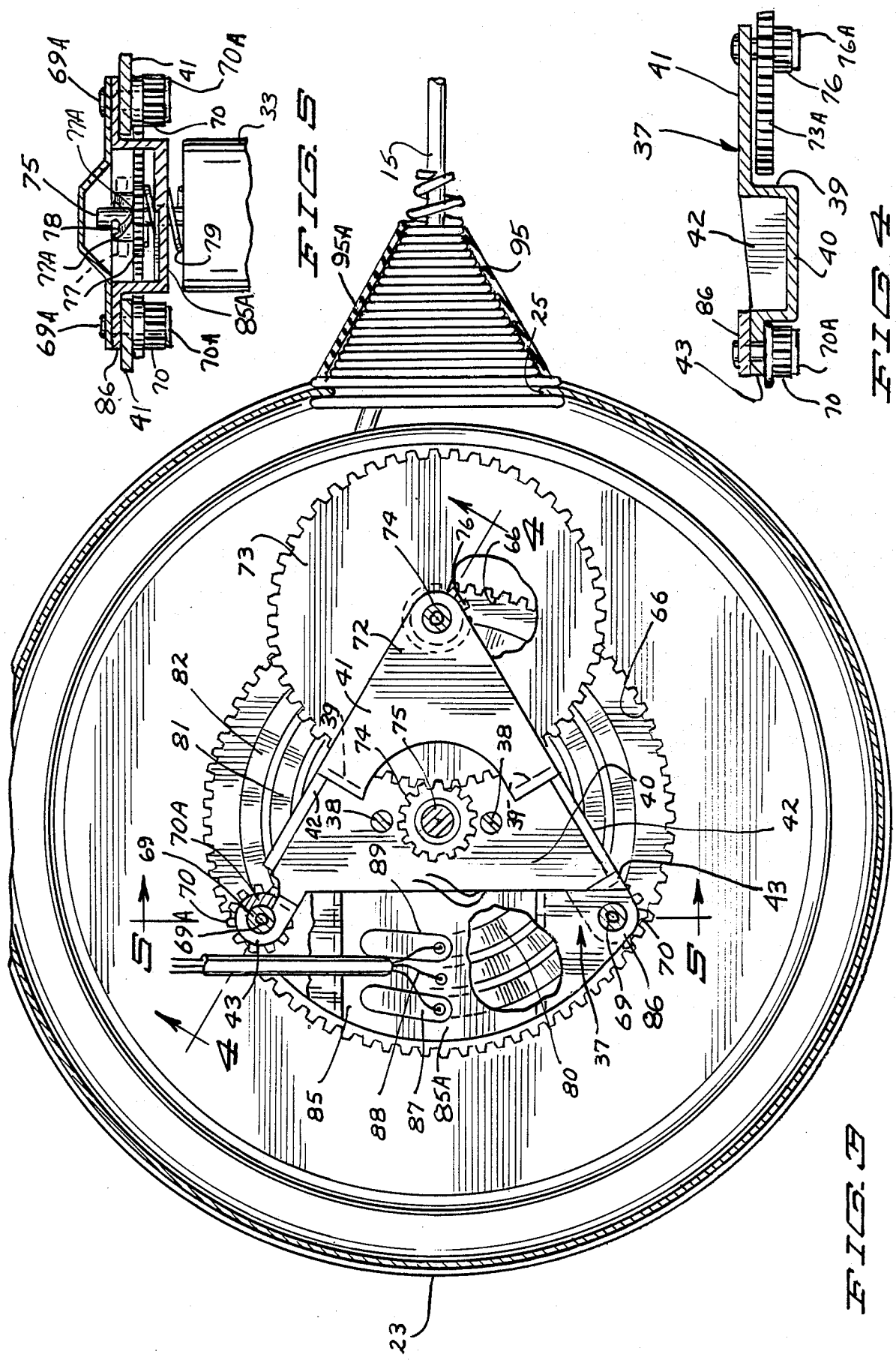

POWER RETRACT ELECTRIC CORD REEL

CROSS REFERENCE TO RELATED APPLICATION

This application is a continuation of copending application Ser. No. 07/028,034, filed Mar. 18, 1987, now abandoned, which application in turn was a continuation of application Ser. No. 06/738,677, filed May 28, 1985, now abandoned.

BACKGROUND OF THE INVENTION

1. Field of the Invention

The present invention relates to electric cord reels and in particular reels which have a power drive retracting motor.

2. Description of the Prior Art

There has been a wide variety of small, spring motor drive retracted cord reels that have been advanced in the prior art.

Typical of the spring motor drive retracting cord reels is the device shown in U.S. Pat. No. 3,619,518 to Charles H. Blanch et al. This has a torsion spring motor on the interior of a reel that is wound or tightened as the cord on the reel is extended, and then upon release of a pawl or latch, the spring will act to retract the reel. Blanch et al also have two prior patents: U.S. Pat. Nos. 3,432,623 and 3,450,369. These also show essentially the same thing with different types of springs and drives.

A further type of spring motor type reel is shown in Johnson et al, U.S. Pat. No. to Johnson et al, 2,530,773.

U.S. Pat. No. 3,400,423 also shows a cable reel which utilizes a spring motor and has contacts and slip rings for carrying electric power to the cord on the reel.

U.S. Pat. No. 2,625,344 also shows an electric cord reel mounted on a lawn mower. The cord reel is driven by a friction drive from the motor that is being powered to rotate the reel, and to take up slack in the cord as the mower is used.

A combined cord reel and switch is shown in U.S. Pat. No. 2,825,924. In this instance, provided slip rings and contacts also form the switch which controls power to a vacuum cleaner. The cord reel is driven by a spring return motor for retracting the cord.

U.S. Pat. No. 3,011,033 also shows a cord winder having a spring rewind motor installed therein.

A remote control target apparatus which has a reel that is driven at the same time the wheels for moving the target apparatus are driven is shown in U.S. Pat. No. 3,770,914. It includes a special stop switch to stop the car adjacent to the front edge of the range, and a stop member adapted to alternately actuate a pair of spaced switches, which are adapted to actuate circuits for activating the car to move in the opposite direction. The switches in this instance are mounted onto the movable frame for the target carrier.

U.S. Pat. No. 4,436,190 illustrates a torsionless multiple conductor reel device which has a motor that will drive a cord reel to retract, but requires a large stand and complex mechanism to do so. It also uses an intermediate type reel and cable adapted to result in elimination of torsional stresses on the cord itself.

U.S. Pat. No. 4,350,850 shows a self switching electrical cord reel of the type that mounts a trouble light, uses a coil spring retraction motor, and includes a switch that will shut off the light when the light is retracted.

A traveling bridge with a power cable reel as rotated in response to bridge movement is shown in U.S. Pat. No. 3,853,209. It has a large bridge that travels across support tracks or guides so that the cable will be payed out or drawn in at lineal speed which is nominally equal to the speed of movement of the bridge. Cables extend out in opposite directions from the reels, so that as the bridge moves, one of the cables will be under tension and will be payed out while the other cable is wound up.

U.S. Pat. No. 3,694,5SS shows a reel construction that has a spring motor mounted therein and coupled to the reel for driving it as well and suitable slip rings for carrying power to the rotating elements. None of the prior art shows a simply operated electric motor power retracting reel that is compact enough to mount under the hood of a vehicle and which will provide for the retraction of the reel positively, particularly in cold weather when such a reel might be used, and automatically shutting off the power when the reel is fully retracted.

SUMMARY OF THE INVENTION

The present invention relates to an electrical cord reel which is used for storing an electrical cord to carry power to a desired location from an outlet plug, and which cord is extendable manually and retractable under power. The primary use envisioned for the device of the present invention is in connection with providing power to automotive engine heaters and power cords for motor homes or large campers. Engine heater cords are used in cold weather climates to plug into a line power source and energize a suitable heater at night and, in particular, to keep the automotive engine relatively warm and operable. Motor homes or campers use outside power at campsites.

The cord reel has to be mounted in a relatively small space so that it is unobtrusive, and also provides storage for a satisfactory length of power cord. Spring motors are at times unreliable for retracting stiff cords (which happens when the cold weather sets in) and the additional frictional load that is encountered when lubricants and the like become cold makes spring motors undesirable, as well as bulky for the torque provided. The power has to be carried across the rotating reel to a fixed outlet connection for the engine heater, and doing this in a compact space, at a reasonable cost, has not been accomplished. A spring motor will only drive 15 to 20 turns, and for long cords a larger diameter reel is needed. Thus, spring motors do not lend themselves to compact construction.

The present invention includes a drive motor that mounts on the interior of the hub of a reel, and has suitable drive gears to rotate the reel at a desired speed, after being energized by the battery of the vehicle with which the reel is used. The cord passes through a sliding switch member so that upon retraction of the cord, the switch member is actuated to shut off power to the motor driving the reel.

BRIEF DESCRIPTION OF THE DRAWINGS

FIG. 1 is a fragmentary view of a vehicle having a cord reel made according to the present invention installed thereon;

FIG. 2 is a part schematic sectional view of a cord reel and switching mechanism made according to the present invention, with the section of the cord reel housing taken generally along line 2—2 in FIG. 3.

FIG. 3 is a sectional view taken generally along line 3—3 in FIG. 2;

FIG. 4 is a sectional view of a support used in the retraction reel taken as on line 4—4 in FIG. 3, with parts removed for clarity; and FIG. 5 is a sectional view taken as on line 5—5 of FIG. 3.

DETAILED DESCRIPTION OF THE PREFERRED EMBODIMENTS

FIG. 1, a vehicle indicated generally at 10, has an engine heater 11 (FIG. 2) that is used for warming the engine of the vehicle. In the case of the motor home the connection would be to the main power connection. The heater or appliance 11 uses 110 volt power from a receptacle 12 that can be mounted on a wall 13 and which is powered from a suitable 110 volt power source. The receptacle 12 is connected to the heater 11 through the use of a cord 15, having a plug 16 of conventional design, that extends from the grill portion 17 of the vehicle 10. The plug 16 is accessible through the grill portion 17 when it is in its retracted position.

A cord reel, shown generally at 20, is mounted in a convenient manner onto a support 21 on the interior of the vehicle engine compartment. Because many vehicles now have very limited interior space in the engine compartment, it is important that the overall size of cord reel 20 be kept to a minimum, and mounting can be done in a variety of different ways. For example, the cord reel housing can be placed onto a wall in the engine compartment using suitable brackets in a normal manner.

The cord reel 20 includes an outer case 22 that is formed as an assembly. The case is uniquely constructed, and has a central annular flexible plastic band 23 that is formed generally in a circle. It also has an opening indicated at 25 at one opposite side of the circle, and as will be shown, this is used for the cord 15 to pass outwardly from the case 22.

The annular band 23 has a tapered groove as indicated at 26 at its opposite edges that extend all the way around the formed annular band. The recesses 26 shown on the lower portion of FIG. 2 are used for receiving the edge of a formed sheet metal lower housing of case section 30 that frictionally fits into this recess, and thus keeps the plastic band in an annular shape. A top housing of case section 31 fits into the recess 26 around the annular band 23 on the top side as shown in FIG. 2. The two housing or case sections 30 and 31 are retained relative to a centrally mounted motor 33, which is the reel drive motor. As shown, the case section 30 is held against the base of the motor through suitable spacers 35, with screws shown generally at 36. The case section 30 has dimples formed around the heads of screws 36 so the heads are recessed from the plane of the outer surface of the case section 30.

The front end of the motor mounts a spider bracket indicated generally at 37 that is fastened to the shaft end of the motor housing with suitable screws 38 as shown in FIG. 3.

The spider 37 is generally triangular shaped as shown in FIG. 3, and has a wall 40 that rests on the end of the housing of motor 33. The screws 38 will pass through wall 40. As shown in FIGS. 2, 3 and 4, the spider 37 has a wall section 41 that is offset from wall 40. The wall section 41 is made so it is against the case section 31. The wall section 41 is supported on legs 39 that extend from wall 40. There are spaced apart end members 43 that are also offset from wall 40. The end members 43 form hubs and are reinforced with gussets or reinforcing walls 42. End portions 43 are offset a slightly different amount than wall 41. This offset construction provides spacing behind wall portion 41 and end members 43 for mounting of gears.

The cord reel hub shown at 50 (FIG. 2) includes a molded plastic drum 51 having an outer cylindrical drum surface, an end wall 52 that is within the internal bore of the drum, and a molded flange 53 that is at the end adjacent the drive shaft of the motor. The flange 53 is perpendicular to the axis of rotation of the reel, which is coincident with the central axis of the motor 33. The wall 52 has an opening through which the motor 33 extends, as shown. The opening has a partial hub flange that supports the motor outer surface.

Thus, the motor is mounted on the interior of the drum 51, and the cord 15 is positioned to wind onto the drum outer surface.

A separate reel end flange 60 closes the open end of the drum 51 and forms a second end flange that retains a cord on the drum. Flange 60 is made of suitable metal and has an annular neck 61 that press fits into the interior of the drum 51.

The reel assembly, including drum 51 and flanges 53 and 60, is supported on the interior of the outer case through small hubs on the internal ends of internal drive gears at the end near the flange 53 and idler rollers at the end adjacent flange 60. On the open end of the reel, that is near the lower case portion 30 and flange 60, there are three idler rollers indicated at 63 positioned on the interior of the drum portion of the reel and riding on the interior surface of the neck 61 to provide guiding. These idler rollers 63 are rotatably fastened with suitable screws to the case portion 30, and because there are three of the rollers (in FIG. 3 they are axially aligned with the three ends of the spider 37), they support the interior of the drum in a very stable manner. This end of the drum is thus supported relative to the outer case.

The internal surface of the plastic drum 51 adjacent the flange 53 has gear teeth indicated at 66 defined therein. These teeth are molded in place, using known techniques. The spider 37 mounts suitable idler gears shown at 70 on suitable post type pins 69 at the outer end members 43, and these idler gears are axially aligned with two of the idler rollers 63. The idler gears 70 are positioned on the inner side of the end members 43 as shown in FIG. 4 and the idler gears will rotate freely on the post pins when the unit is assembled. The gears 70 have flanges 70A on their inner ends for rolling contact for supporting the drum. The teeth 66 of the internal gear of the drum ride on the flanges 70A. Screws 69A are threaded into the post portion of pins 69 which fit snugly in the spider (even with a slight press fit) to hold the case section 31 in place.

At the apex of the spider, indicated generally at 72 in FIG. 3, a main drive gear assembly indicated at 73 is mounted on a suitable pin that is a post type pin 74 which fits snugly into the corresponding aperture of the spider. The pin has a post portion on the inner end and is threaded to receive screw 74A that will be used to hold the top cover 31 to the spider and properly in place.

The gear assembly 73 has a large diameter input gear section 73A that meshes with a clutching drive gear 77 mounted on the motor output shaft 75 of the motor 33. The drive gear 77 will, when motor 33 is driven, be moved to position to engage gear 73A and transmit torque from the motor shaft to the input gear section 73A.

The gear assembly 73 further includes an interior reel drive gear 76 that is of the same size as the idler gears 70 and meshes with the gear teeth 66 on the interior of the drum 51 of the reel 50. Gear 76 has a hub 76A that supports the drum as the drum is driven by gears 73A and 76. Thus, the inner hubs 70A and 76A of gears 70 and 76 support the reel in three locations (at the corners of the spider) just as the idler rollers 63 do. The reel is thus supported within the housing or case and is rotatable with respect thereto. Note that the gear assembly 73 is on the interior side of the wall portion 42 of the spider 37, so that the tendency of the reel to move outwardly (upwardly as shown in FIG. 2) is resisted through the spider because the spider is fastened to the end of the motor 33, and the opposite end of the motor is attached to the case section 30.

The drive gear 77 has a hub that slides on output shaft 75. The end of the hub has two cam peaks shown at 77A, which are 180° apart. There are two recesses between these cam peaks 77A, also 180° apart. The cam peaks are shown in FIGS. 2 and 5. A pin 7B is mounted in shaft 75 near the outer end of the shaft and serves as a drive pin. A light spring 79 is placed between the gear and a backing washer that backs against the end of motor 33. The spring 79 tends to urge the gear 77 outwardly, and the gear can move to its solid line position in FIG. 2, disengaged from gear 73A, with the pin 78 in the recesses on the hub. In this position, the reel assembly can rotate easily because the drive is disengaged. The spring 79 is light, and when the motor 33 is energized, the shaft will tend to spin within the hub for drive gear 77 because of the inertia of gear 77, and the pin 7B will ramp up the cam surfaces leading to the hub peaks 77A. As this occurs, the gear is moved toward the motor end and toward gear 73A and will mesh with gear 73A. Gear 77 will be stopped with the inner end of the hub of drive gear 77 against the end of motor 33. The pin 78 will still be engaging the cam peaks on the hub of drive gear 77, as shown in FIG. 5, so the motor will drive the gear 77 and gear assembly 73.

The clutch for driving gear 77 is similar to the bendix drive for an automobile starter motor, except the clutch shown will drive in either direction of rotation. The clutch can also comprise a one-way clutch mechanism that will transmit adequate power from the motor to gear assembly 73, and free wheel in one direction, and which will fit into a small space.

The wall 52 on the reel, as shown, has suitable annular slip rings indicated at 80, 81 and 82 mounted thereon. The slip rings are of conventional design and are imbedded into the plastic wall 52 and extend annularly around as shown in FIG. 3. A contact block assembly 85 is mounted between the end members 43. The contact block has a center wall 85A and end members 86 offset to form spacers on the outside of the gears 70 and on the inside of the upper cover 31 (see FIGS. 3 and 5). The members B6 fit over the idler gears 70 and are held in place on the cover section 31 through the use of screws that thread into the post type pins 74 for the idler gears. The contact or terminal block 85 has three sliding contacts therein formed in a suitable manner and indicated generally at 87, 88 and 89, which align with the slip rings 80, 81 and 82, respectively. The main portion 85A of the block 85 nests between the end members 43 of the spider 37.

A heater lead cord 90 is provided from the heater 11 and passes through a suitable grommet connection into the interior of the reel case and is connected with individual wires, as shown, to each of the sliding contacts 87, 88 and 89 to provide for transfer of power from the slip rings 80, 81 and 82 to the heater 11.

Additionally, a power cord indicated at 92 is passed through a suitable aperture in the reel section 31, and is used for controlling the switch for driving the motor 33, as will be explained. The power cord 15 is passed through a suitable coil spring guide indicated at 95 that is held in place under spring tension in the opening shown in the plastic ring 23. This spring guides the cord 15 and prevents it from being crimped or tightened too tightly. The outer end of the spring guide 95 can flex to any side if the cord is fed in at an angle. A waterproof sleeve 95A can be suitably held over the base portion of spring 95 to keep moisture out of the interior of the case. The outer end has coils that are separated to permit material such as ice or snow to drip out and can have a wiper gasket 95B that wipes the cord. The other end of the cord 15, which is shown at 15A in FIG. 2, is held with a suitable wall bracket 96 that is formed on the wall 51 and comprises a part annular guide for the power cord. This will hold the cord 15 and the cord length section 15A in place, and then the leads are connected through suitable connectors 97 to the respective slip rings 80, 81 and 22.

Thus, when the plug 16 is connected to power, power will be carried through the cord (one line is a ground wire) 15 to the slip rings 80, 81 and 82, and then through the lead member 90 to the heater 11.

The control of power to the motor 33 is through a switch assembly indicated generally at 100 in FIG. 2. The switch assembly is mounted on a base 101, just to the rear of the grill 17 of the vehicle 10 and comprises a housing 102 which is supported onto a suitable upright support 103 that is fastened to the base 101. The housing 102 comprises a sleeve in which a switch slider 104 is slidably mounted. The cord 92 for the reel drive motor 33 terminates at a switch assembly 105 that has an actuator button 106 that extends through an opening in the sleeve 102, and the switch slider 104 has a recess 107 that is of sufficient depth around the periphery of the slider 104 so that when the recess 107 is aligned with the button 106, the switch is turned on, and this is the position shown in FIG. 2. However, when the slider 104 has slid to its dotted line position shown in FIG. 2, the outer surface of the slider will actuate the button 106 to shut the power off to the motor 33.

The motor 33 may be a dual voltage motor, powered by a vehicle battery 110, so that it runs on 12 volts or may be powered by 110 volt current, if desired. When the engine heater is to be plugged in, the plug 16 will be in its dotted line position and the slider 104 will be retracted to shut off power to the motor 33. Plug 16, which is accessible through the grill, can then merely be pulled out and the clutch of gear 77 will permit the hub 51 of the reel 50 to rotate and the gears that are supporting the hub including the gear assembly 73 and the idler gears 70 will merely rotate freely to permit the power cord to be pulled out.

The through opening indicated at 112 of the slider assembly 104 will permit the cord to be pulled out easily, and it can then be plugged into the receptacle for powering the heater. The slider 104 can be under sufficient friction load to remain in its position where motor 33 remains unengaged, or a detent can be provided to hold the slider 104 in position until it is manually moved. To retract the cord 15, the plug 16 will be removed from the outlet, and the operator then pulls the switch slider 104 to its solid line position, which will energize the motor 33 and through the drive gear 77, which will then engage gear section 73A, drive the reel 50 to wind the cord 15 back into the housing.

When the plug 16 strikes the outer end of the slider 104, the load from the drive motor will act to pull on the cord 15 and pull the slider 104 to its dotted line position, thereby shutting off the switch 105 and disabling the motor 33 after the cord is fully retracted. The slider 104 has beveled or rounded ends to permit the cord 15 to move easily through it, and as can be seen, the flange member 112 has an annular shoulder that strikes the sleeve 102 to prevent the member from being pulled outwardly too far. The switch slider 104, as stated, will be suitably detented so that it does not actuate the switch unintentionally during manually pulling of the cord 15 outwardly. The motor 33 can be a twelve volt DC permanent magnet motor, for example a Brevel motor, Stock No. 724-980142. A reduction ratio of approximately forty to one between the motor shaft and the drive to the reel is provided, and the winding speed can be approximately 40 rpm when it is retracting the reel. The loaded speed of the motor shaft 75 is in the range of 2700 rpm.

The flexible wire spout 95 wipes the cord 15 clean of water and the like as it is retracted, to keep foreign materials out of the interior of the case, and of course, the reel can be made in different sizes with different capacity motors to suit the amount of cord that is desired. Generally, a 25 foot cord is all that is needed, but in certain instances, 50 feet or longer would be desirable.

In assembling the case, the spider is assembled with the idler gears and the gear assembly 73 held in to the spider with the post portion of pins 69 and 74. The terminal block is also mounted, and the cord 90 can be attached to the terminal block. The spider then is attached to the motor 33 with screws 38 and the case portion 31 will be put into place. Screws 69A and 74A are then subsequently fastened to the post pins and hold the case portion 31 in place. The post screws 69 and 74 hold the gears in position and hold the case section 31 secured.

The reel 50, then, can be slipped into place over the gears 70 and 76, with the band 23 already placed on the case section 31. The cord 15 will have been placed through the wire member 95 and onto the drum of the reel prior to the time the reel is slipped into place, and then after the reel is slipped into place, the case section 30 can be put into position on the plastic rim 23, and the screws 36 fastened to hold the assembly together relative to the motor.

The unit is relatively low cost and easy to use, and can be provided in a wide variety of sizes. It is easily adapted for use with motor homes and campers that have a need for coupling to 110 volt sources. The reel is compact and yet powerful, to retract a substantial length of cord.

Although the present invention has been described with reference to preferred embodiments, workers skilled in the art will recognize that changes may be made in form and detail without departing from the spirit and scope of the invention.

What is claimed is:

1. A power driven cord reel for an engine heater in a vehicle comprising:
   a reel having a drum, and spaced apart flanges mounted on the drum, said drum permitting an electric cord to be wound thereon;
   a case member housing said reel;
   a drive motor mounted on the interior of said drum, said case member having portions held relative to opposite ends of said drive motor to form an assembly, said drive motor having an output shaft and being powered by a battery of a vehicle having an engine heater;
   idler roller means journaled on the case member for rotatably supporting said drum;
   gear means mounted relative to said drive motor and having portions engaging said drum on at least one end of said drum, said drive motor having a drive gear engaging said gear means for rotatably driving said gear means and the drum; and
   brush and slip ring means to carry power between the case and the reel to permit electrically coupling an engine heater to a cord on the reel.

2. The apparatus of claim 1 and a spring guide mounted on said case member to define an outlet from said case, a cord mounted on said reel and passing through said spring guide, said spring guide having an outer portion to wipe against the cord.

3. An electrical cord reel for mounting an electric cord having a plug at one end, being adapted to power an electric component, said reel comprising:
   a housing;
   a reel member having a tubular drum and end flanges spaced along said tubular drum;
   said tubular drum having a gear teeth defined therein on one end thereof, and an annular interior surface at the other end thereof;
   a gear support spider;
   a drive motor positioned coaxially with the axis of rotation of said drum and mounting said gear support spider; said drive motor having an output drive shaft with drive gear means thereon;
   gear means rotatably mounted on said spider at substantially equally spaced positions around the axis of rotation of the drum and engaging the gear teeth means on the interior of the drum to support the drum on said gear means on the spider, said gear means including at least one gear that engages the drive gear means on the motor shaft, whereby upon rotation of the motor shaft in one direction, the gear means are rotated under power to drive the drum;
   idler roller means mounted on said case at the opposite end of said drum from said gear means, and adapted to rotatably support the opposite end of said drum on the interior annular surface for rotation about said axis;
   slip ring means mounted on said drum and housing and including a stationary terminal block on the housing, said stationary terminal block having a power cord connected thereto to lead to said electric component;
   said slip ring means being coupled to wires on the electric cord; and
   switch control means for powering said drive motor comprising a slider movable between first and second positions wherein the motor is powered and unpowered, respectively, said switch control means comprising a sleeve through which the electric cord extends and freely slides in a first direction, and said switch control means being moved to its first position manually to drive said reel to retract said electric cord, said plug on the end of said electric cord engaging such switch control means and moving it to its second position when the electric cord is retracted a desired amount.

4. The electric cord reel specified in claim 3 in combination with a vehicle mounting said reel, and wherein the electrical component comprises a engine heater on a vehicle, and wherein said switch control means said reel are mounted on said vehicle to power said engine heater for said vehicle, said switch control means being mounted adjacent the exterior of said vehicle to permit the switch control means to be manually operated from the exterior of the vehicle.

5. A power driven cord reel comprising:
   a reel having a drum, and spaced apart flanges mounted on the drum;
   a case member housing said reel;
   a drive motor mounted on the interior of said drum, said case member having end portions held relative to opposite ends of said drive motor, said drive motor having an output shaft rotatable about a central axis;
   a plurality of support means mounted at the end of the motor adjacent the output shaft and having portions supported on the case member and extending to provide support for said drum to maintain said drum centered for rotation about the same axis as the axis of the output shaft;
   gear means mounted on said support means engaging an interior of said drum adjacent one end of said drum to drive said drum for rotation about an axis, said drive motor having a drive gear drivably engaging said gear means to rotate said drum; and
   idler roller means journaled on the case member at the opposite end of said drum and engaging and rotatably supporting said drum relative to said case, whereby energization of said drive motor will drive said drum through the gear means while supported.

6. The apparatus as specified in claim 5 wherein said motor is an electric motor and wherein said drive gear is mounted on said output shaft of said electric motor, clutch means between the output shaft and drive gear for disengaging the output shaft from the drive gear, whereby said drum can be rotated in at least one direction of rotation relative to the electric motor shaft to unwind the cord, said clutch means engaging the drive gear to the output shaft for driving the drum in a direction to wind the cord when the electric motor is powered.

7. A power driven cord reel comprising:
   a reel having a drum, and spaced apart flanges mounted on the drum;
   a case member housing said reel;
   means to support said reel for rotation relative to the case member about an axis;
   an electric drive motor mounted relative to said case member, said drive motor having an output shaft centered on said axis;
   gear means mounted relative to said drive motor having portions thereof engaging said drum to drive said drum for rotation about said axis, said drive motor having a drive gear engaging said gear means for rotatably driving said gear means;
   switch means to couple a power source to said drive motor and including a tubular cord guide portion through which the cord slides and which is linearly slidable in one direction for turning said switch on to power the motor and slidable in an opposite direction to turn the motor off; and
   an electrical cord wound on said drum and extending through the cord guide portion, said electrical cord having an end plug thereon, and upon retraction of said electrical cord by rotation of the drum by said drive motor after the linearly slidable portion has been moved to turn the switch means on, cord retractine movement is guided by the cord guide portion and said cord end plug engages the linearly slidable cord guide portion of said switch means and is operable to operate the linearly slidable cord guide portion to actuate the switch means to turn off the power to said drive motor when the electric cord is retracted.

8. The power driven cord reel of claim 7 and electrical terminals mounted on the case member, and slip ring means on the reel for carrying signals from the electrical cord to the electrical terminals on the case member.

* * * * *